United States Patent
Commeine et al.

(10) Patent No.: US 10,100,880 B2
(45) Date of Patent: Oct. 16, 2018

(54) RELEASE BEARING FOR CLUTCH MECHANISM

(71) Applicant: VALEO EMBRAYAGES, Amiens (FR)

(72) Inventors: Emmanuel Commeine, Courcelles sous Moyencourt (FR); Gilles Lebas, Villers Bretonneux (FR)

(73) Assignee: Valeo Embrayages, Amiens (FR)

( * ) Notice: Subject to any disclaimer, the term of this patent is extended or adjusted under 35 U.S.C. 154(b) by 0 days.

(21) Appl. No.: 15/415,049

(22) Filed: Jan. 25, 2017

(65) Prior Publication Data

US 2017/0211634 A1    Jul. 27, 2017

(30) Foreign Application Priority Data

Jan. 25, 2016    (FR) ...................................... 16 50547

(51) Int. Cl.
| | |
|---|---|
| *F16D 23/14* | (2006.01) |
| *F16D 25/08* | (2006.01) |
| *F16H 57/021* | (2012.01) |
| *F16C 19/10* | (2006.01) |

(52) U.S. Cl.
CPC .............. *F16D 23/14* (2013.01); *F16C 19/10* (2013.01); *F16D 25/083* (2013.01); *F16D 25/087* (2013.01); *F16H 57/021* (2013.01); *F16C 2361/43* (2013.01); *F16D 2300/08* (2013.01)

(58) Field of Classification Search
CPC ...... F16C 19/10; F16C 33/78; F16C 2361/43; F16D 25/083; F16D 2300/08; F16H 57/021
See application file for complete search history.

(56) References Cited

U.S. PATENT DOCUMENTS

| | | | | |
|---|---|---|---|---|
| 4,561,531 A | * | 12/1985 | Young | F16D 25/087 192/109 R |
| 5,865,288 A | * | 2/1999 | Thomire | F16D 25/087 192/85.51 |
| 6,062,366 A | * | 5/2000 | Herzig | F16D 25/083 192/30 W |
| 6,085,885 A | * | 7/2000 | Herzig | F16D 25/083 192/30 W |
| 2001/0011626 A1 | * | 8/2001 | Meyer | F16D 25/083 192/85.51 |
| 2015/0247575 A1 | * | 9/2015 | Welter | F16D 25/083 92/170.1 |

FOREIGN PATENT DOCUMENTS

| | | |
|---|---|---|
| DE | 1939987 A1 | 2/1971 |
| EP | 2730796 A1 | 5/2014 |
| FR | 2786837 A1 | 6/2000 |
| GB | 2227293 A * | 7/1990 ............. F16D 25/08 |

* cited by examiner

*Primary Examiner* — Jacob S. Scott
*Assistant Examiner* — Tinh Dang
(74) *Attorney, Agent, or Firm* — Berenato & White, LLC

(57) ABSTRACT

The invention relates to a release bearing (1), in particular for a motor vehicle, having a body (2) delimiting a pressure chamber (22), and a piston (18) mounted slidingly in the chamber (22), the piston (18) being intended to actuate a diaphragm as it slides with respect to the body (2), wherein the body (2) has at least one supply orifice (12) opening at one end into the pressure chamber (22) and at another end into a supply groove (8) configured on an outer surface (3) of the body (2), sealing means (11) being located on either side of said channel (8).

19 Claims, 4 Drawing Sheets

RELEASE BEARING FOR CLUTCH MECHANISM

CROSS-REFERENCE TO RELATED APPLICATIONS AND CLAIM TO PRIORITY

This application is related to Patent Application No. 1650547 filed Jan. 25, 2016 in France, the disclosure of which is incorporated herein by reference and to which priority is claimed.

FIELD OF THE INVENTION

The present invention relates to a release bearing, in particular for a motor vehicle.

BACKGROUND OF THE INVENTION

A clutch conventionally has a reaction plate, a movable pressure plate, and a friction disk mounted between said reaction and pressure plates. Movement of the pressure plate is controlled by a diaphragm, controlled in turn by a release bearing. The friction disk is rotationally connected to an input shaft of a gearbox, and the reaction plate is, for example, rotationally integral with a flywheel connected to the driving shaft, for example a crankshaft of an internal combustion engine.

The release bearing is controlled by an actuator driven by an electronic computer so as to exert a predetermined force on the diaphragm and displace it a given distance.

The pressure plate is thus movable between an engaged position in which the friction disk is clamped between said pressure and reaction plates, and a disengaged position in which the friction disk is released.

It is known to use a release bearing having a tubular body intended to be passed through by the input shaft of the gearbox, and an actuator having a tubular movable part, also called a "piston," engaged into an annular pressure chamber of the body and movable in translation parallel to the axis of the body. The piston of the actuator is intended for actuation of a clutch diaphragm, for example by means of a ball bearing. The piston is thus movable between an engaged position in which an engine torque is transmitted to the input shaft of the gearbox, and a disengaged position in which no torque is transmitted to that shaft.

A release bearing of this kind thus has an actuator of the concentric slave cylinder (CSC) type.

A release bearing of this kind is known in particular from the document FR 2 786 837, in the name of the Applicant.

The tubular body of this release bearing has a fluid supply orifice opening into the pressure chamber and attached to a supply conduit.

The use of a conduit and of appropriate attachment means is a laborious solution, and requires complex assembly.

SUMMARY OF THE INVENTION

An object of the invention is in particular to provide a simple, efficient, and economical solution to this problem.

It proposes for that purpose a release bearing, in particular for a motor vehicle, having a body delimiting a pressure chamber, and a piston mounted slidingly in said chamber, said piston being intended to actuate a diaphragm as it slides with respect to the body, wherein said body has at least one supply orifice opening at one end into the pressure chamber and at another end into a supply groove configured on an outer surface of the body, sealing means being located on either side of said channel.

The release bearing can then be associated on the one hand with a gearbox housing in which a fluid supply channel, opening opposite the supply groove, is machined. Sealing means allow the fluid, intended to supply the pressure chamber and emerging from said supply channel, to be confined in the supply groove, the fluid then being directed toward the pressure chamber through the corresponding orifice of the body of the release bearing.

The pressure chamber and the piston can be annular.

The sealing means can have at least two O-rings located on either side of the supply groove.

The O-rings thus extend annularly on each side of the supply groove, so as to prevent the fluid contained in said supply groove from escaping at the interface between the gearbox housing and the body.

In this case, each O-ring can be received in a groove of the body.

The body can be annular and can have several supply orifices, distributed over a single circumference and each opening into the supply groove and into the pressure chamber.

The supply groove then performs the function of a fluid collector in order to distribute that fluid uniformly through the various supply orifices.

The piston can be annular and can have a first end mounted in the pressure chamber of complementary annular shape, and a second end equipped with a bearing, for example a thrust ball bearing, intended to be axially inserted between the diaphragm and the piston.

The invention also relates to an assemblage having a gearbox housing and a release bearing of the aforementioned kind, said housing having a receptacle in which the body of the release bearing is at least partly mounted, said housing having a fluid supply channel opening at the inner wall of said receptacle, opposite the supply orifice or the supply groove of said body.

The fluid-conveying connection between the gearbox housing and the release bearing is thus established directly, without the use of conduits or additional connectors, which allows assembly to be simplified and the cost of such an assemblage to be reduced.

BRIEF DESCRIPTION OF THE DRAWINGS

The invention will be better understood, and other details, characteristics, and advantages of the invention will emerge, upon reading the description below provided as a non-limiting example referring to the attached drawings, in which.

DETAILED DESCRIPTION OF THE PREFERRED EMBODIMENT(S)

Figure 1:
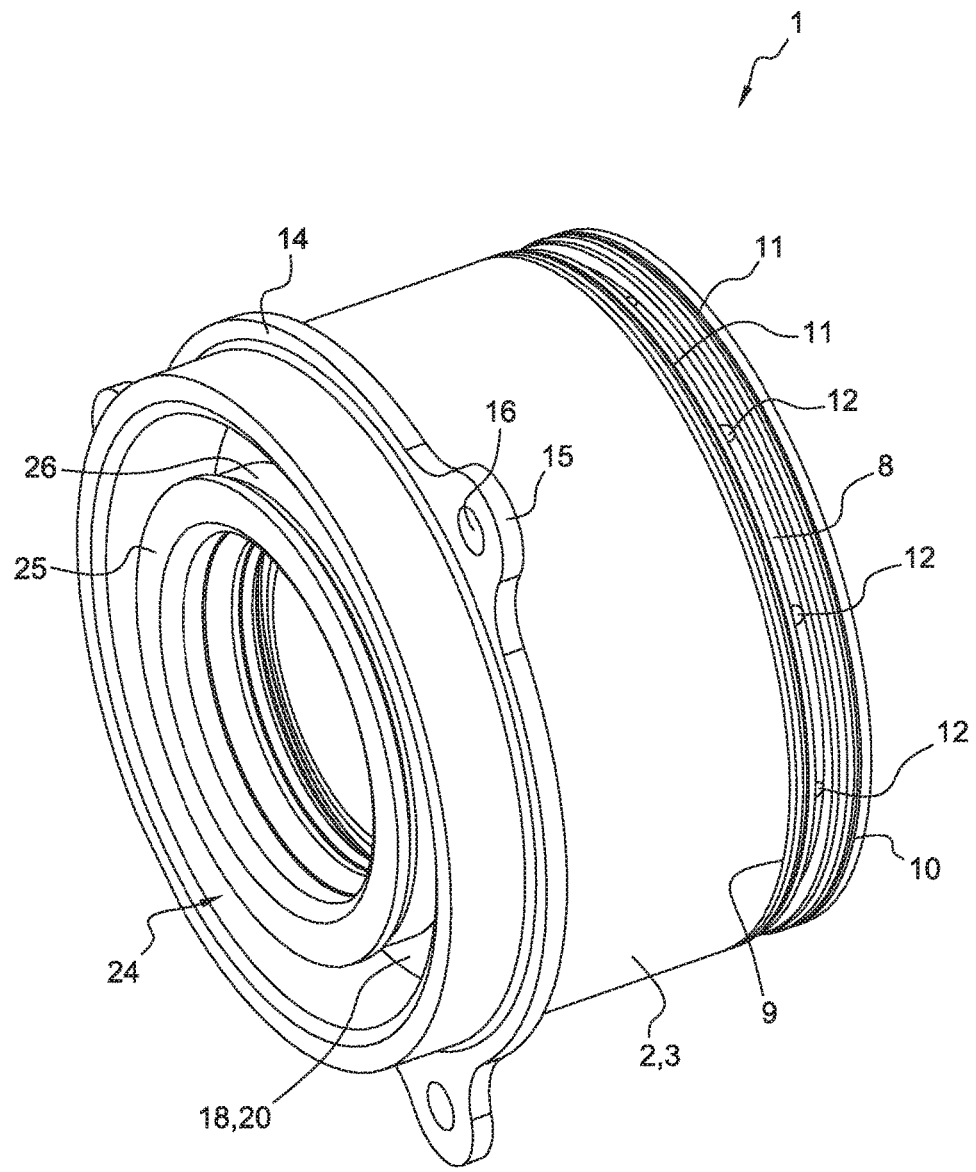
FIG. 1 is a perspective view of a release bearing according to an embodiment of the invention.
Figure 2:
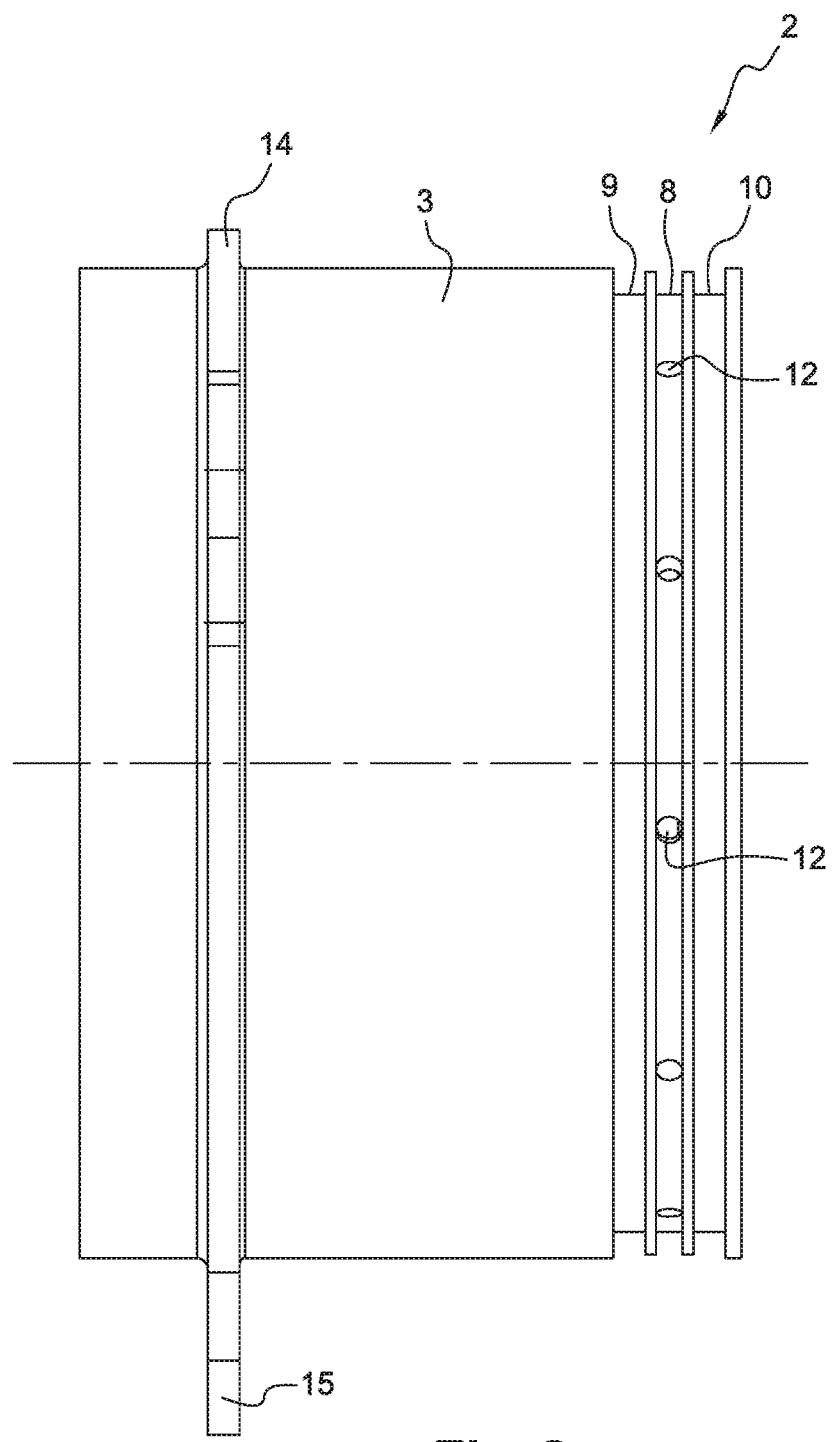
FIG. 2 is a side elevational view of the body.
Figure 3:
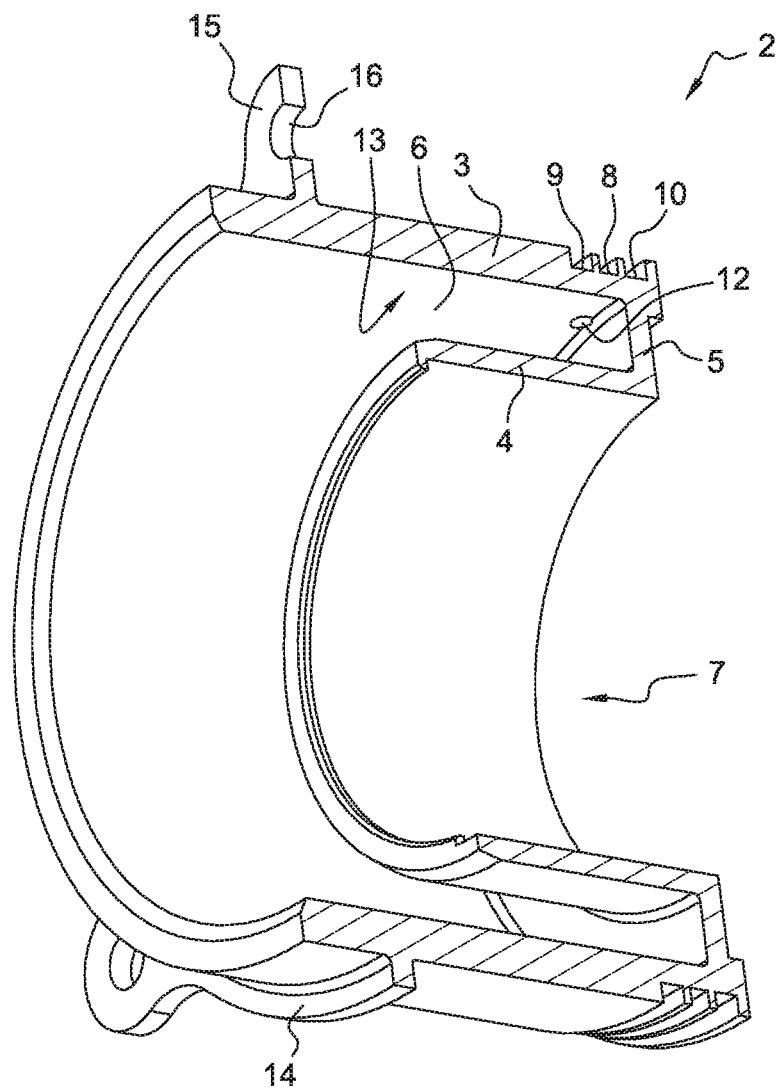
FIG. 3 is an perspective axial section view of the body.

FIGS. 1 to 5 illustrate a release bearing 1 for a clutch mechanism of a motor vehicle according to an embodiment of the invention. Release bearing 1 has a cylindrical body 2 having a radially outer cylindrical wall 3 and a radially inner cylindrical wall 4. Said walls 3, 4 are linked at one of their ends by a partition 5 extending radially. The walls 3, 4 and the partition 5 delimit an annular receptacle 6 open toward the front, i.e. to the left in the Figures.

Inner wall 4 internally delimits a passage 7 intended to be passed through by an input shaft of the gearbox (not depicted).

The rear end of radially outer wall 3 has three annular grooves 8, 9, 10 spaced axially away from one another, namely a middle groove 8 and a front groove 9 and rear groove 10 located respectively on either side of middle groove 8. O-rings 11 made of elastomer are mounted in front and rear grooves 9, 10.

Body 2 has cylindrical supply orifices 12, extending radially and opening into the bottom of middle groove 8 and at radially inner surface 13 of outer wall 3. Orifices 12 are, for example, twelve in number and are regularly distributed over the entire periphery.

Outer wall 3 furthermore has, near its front end, an annular radial rim 14 from which fastening tabs 15 or lobes extend radially outward. Fastening tabs 15 have holes 16 allowing the engagement of fastening screws intended to ensure fastening of the body to a gearbox housing 17.

A piston 18 is engaged into the annular receptacle. Piston 18 is annular and has a rear part 19 engaged into said annular receptacle 6, and a front part 20 extending radially toward the inside. The rear end of piston 18 is equipped with sealing means, for example an annular lip seal 21, intended to close off a pressure chamber 22 (FIG. 5) delimited by inner wall 4 and outer wall 3, partition 5, and the rear end of piston 18.

Piston 18 can be equipped with sealing means at its radially outer surface, for example segments 23 that come into abutment against inner surface 13 of outer wall 3 of body 2.

A thrust-type bearing 24 is mounted at the front end of piston 18. This bearing 24 has a front ring 25 intended to face toward a diaphragm 30 (schematically shown in FIG. 5) of a clutch mechanism, a rear ring 26 in abutment against radial front portion 20 of piston 18, and rolling means, for example balls 27, located between front ring 25 and rear ring 26.

Figure 4:
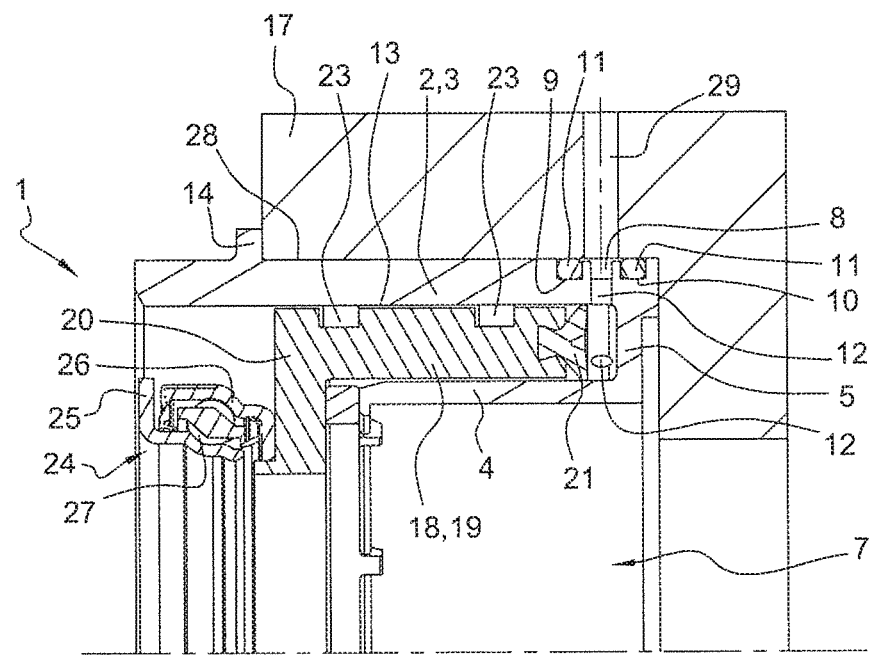
FIG. 4 is an axial half section view of the release bearing in a disengaged position.
Figure 5:
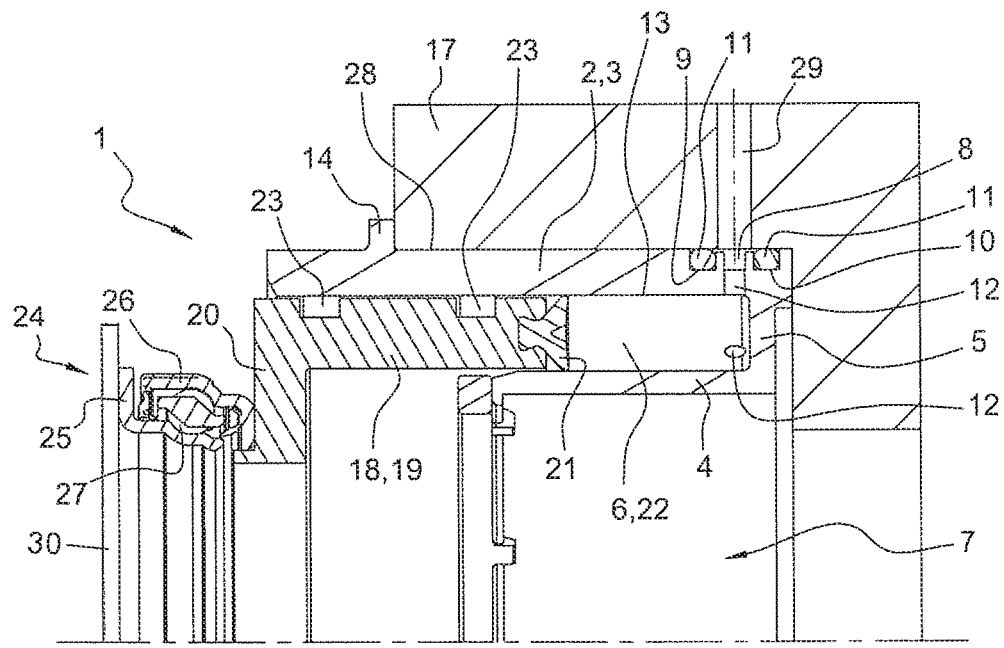
FIG. 5 is an axial half section view of the release bearing in an engaged position.

A portion of clutch housing 17 is visible in FIGS. 4 and 5. It has a receptacle 28 in which body 2 of release bearing 1 is mounted. Clutch housing 17 has at least one supply channel 29 for fluid, for example oil, said channel 29 opening radially at the inner surface of receptacle 28, opposite middle groove 8 and axially between O-rings 11.

The diameter of the mouth of supply channel 29 at the corresponding surface is slightly larger than the axial dimension of middle groove 8.

During operation, the fluid under pressure can be delivered into pressure chamber 22 through channel 29 of gearbox housing 17, middle groove 8, and supply orifices 12 of body 2. When the pressure in pressure chamber 22 is lower than a predetermined value, the axial return force exerted by the diaphragm on bearing 24 and on piston 18 is such that piston 18 is in its retracted position illustrated in FIG. 4. In this position, piston 18 is located mostly in annular receptacle 6 of body 2. This position corresponds to a disengaged position of the clutch mechanism.

Conversely, when the pressure exerted in pressure chamber 22 exceeds the threshold value, piston 18 is displaced forward, pushing on bearing 24 and causing actuation of the diaphragm. This deployed position of piston 18 is illustrated in FIG. 5. This position corresponds to an engaged position of clutch mechanism 1.

The invention thus allows a simple and effective fluid-conveying connection between supply channel 29 of clutch housing 17 and release bearing 24. Groove 8 allows the fluid to be distributed homogeneously through the various orifices 12 into pressure chamber 22.

The invention claimed is:

1. A release bearing (1) for a clutch mechanism of a motor vehicle, the release bearing comprising:
    a body (2) delimiting a pressure chamber (22), and
    a piston (18) mounted slidingly in the pressure chamber (22), the piston (18) operable to actuate a diaphragm of the clutch mechanism as the piston (18) slides with respect to the body (2),
    the body (2) having at least one supply orifice (12) opening at one end into the pressure chamber (22) and at another end into a supply groove (8) configured on an outer surface (3) of the body (2), a sealing device (11) being located on either side of the supply groove (8).

2. The release bearing (1) according to claim 1, wherein the sealing device includes two O-rings (11), and wherein one of the O-rings (11) is located on each side of the supply groove (8).

3. The release bearing (1) according to claim 2, wherein each of the O-rings (11) is received in a groove (9, 10) of the body (2).

4. The release bearing (1) according to claim 1, wherein the body (2) is annular and has a plurality of supply orifices (12) distributed over a single circumference, and wherein each of the supply orifices (12) opens into the supply groove (8) and into the pressure chamber (22).

5. The release bearing (1) according to claim 1, wherein the piston (18) is annular and has a first end mounted in the pressure chamber (22) of complementary annular shape, and a second end equipped with a bearing (24) intended to be axially inserted between the diaphragm and the piston (18).

6. An assemblage having a gearbox housing (17) and a release bearing (1) according to claim 1, the gearbox housing (17) has a receptacle (28) in which the body (2) of the release bearing (1) is at least partly mounted, the gearbox housing (17) further has a fluid supply channel (29) opening at an inner wall of the receptacle (28), opposite the at least one supply orifice (12) or the supply groove (8) of the body (2).

7. The release bearing (1) according to claim 2, wherein the body (2) is annular and has a plurality of supply orifices (12) distributed over a single circumference, and wherein each of the supply orifices (12) opens into the supply groove (8) and into the pressure chamber (22).

8. The release bearing (1) according to claim 3, wherein the body (2) is annular and has a plurality of supply orifices (12) distributed over a single circumference, and wherein each of the supply orifices (12) opens into the supply groove (8) and into the pressure chamber (22).

9. The release bearing (1) according to claim 2, wherein the piston (18) is annular and has a first end mounted in the pressure chamber (22) of complementary annular shape, and a second end equipped with a bearing (24) intended to be axially inserted between the diaphragm and the piston (18).

10. The release bearing (1) according to claim 3, wherein the piston (18) is annular and has a first end mounted in the pressure chamber (22) of complementary annular shape, and a second end equipped with a bearing (24) intended to be axially inserted between the diaphragm and the piston (18).

11. The release bearing (1) according to claim 4, wherein the piston (18) is annular and has a first end mounted in the pressure chamber (22) of complementary annular shape, and a second end equipped with a bearing (24) intended to be axially inserted between the diaphragm and the piston (18).

12. An assemblage having a gearbox housing (17) and a release bearing (1) according to claim 2, the gearbox housing (17) has a receptacle (28) in which the body (2) of the release bearing (1) is at least partly mounted, the gearbox housing (17) further has a fluid supply channel (29) opening at an inner wall of the receptacle (28), opposite the at least one supply orifice (12) or the supply groove (8) of the body (2).

13. An assemblage having a gearbox housing (17) and a release bearing (1) according to claim 3, the gearbox housing (17) has a receptacle (28) in which the body (2) of the release bearing (1) is at least partly mounted, the gearbox housing (17) further has a fluid supply channel (29) opening at an inner wall of the receptacle (28), opposite the at least one supply orifice (12) or the supply groove (8) of the body (2).

14. An assemblage having a gearbox housing (17) and a release bearing (1) according to claim 4, the gearbox housing (17) has a receptacle (28) in which the body (2) of the release bearing (1) is at least partly mounted, the gearbox housing (17) further has a fluid supply channel (29) opening at an inner wall of the receptacle (28), opposite the supply orifices (12) or the supply groove (8) of the body (2).

15. An assemblage having a gearbox housing (17) and a release bearing (1) according to claim 5, the gearbox housing (17) has a receptacle (28) in which the body (2) of the release bearing (1) is at least partly mounted, the gearbox housing (17) further has a fluid supply channel (29) opening at an inner wall of the receptacle (28), opposite the at least one supply orifice (12) or the supply groove (8) of the body (2).

16. The release bearing (1) according to claim 5, wherein the bearing (24) is a thrust ball bearing.

17. The release bearing (1) according to claim 9, wherein the bearing (24) is a thrust ball bearing.

18. The release bearing (1) according to claim 10, wherein the bearing (24) is a thrust ball bearing.

19. The release bearing (1) according to claim 11, wherein the bearing (24) is a thrust ball bearing.

* * * * *